US012789244B2

(12) United States Patent
Riaz et al.

(10) Patent No.: US 12,789,244 B2
(45) Date of Patent: Nov. 10, 2026

(54) SYSTEM AND METHOD FOR RECYCLING PERSONAL PROTECTIVE EQUIPMENT

(71) Applicant: Vitacore Industries Inc., Port Coquitlam (CA)

(72) Inventors: Nida Riaz, Surrey (CA); Linda Tong, Burnaby (CA); Yang Fei, Burnaby (CA); Mikhail Philippe Moore, Delta (CA); William Kornelis Alan Sikkema, Burnaby (CA); Matthew James Wilson, Burnaby (CA)

(73) Assignee: Vitacore Industries Inc., Burnaby (CA)

( * ) Notice: Subject to any disclaimer, the term of this patent is extended or adjusted under 35 U.S.C. 154(b) by 570 days.

(21) Appl. No.: 18/208,135

(22) Filed: Jun. 9, 2023

(65) Prior Publication Data

US 2024/0408655 A1 Dec. 12, 2024

(51) Int. Cl.
*B09B 3/35* (2022.01)
*B02C 19/00* (2006.01)
(Continued)

(52) U.S. Cl.
CPC ............ *B09B 3/35* (2022.01); *B02C 19/0075* (2013.01); *B02C 23/14* (2013.01); *B09B 3/29* (2022.01); *B09B 3/50* (2022.01); *B29B 9/06* (2013.01); *B29B 13/08* (2013.01); *B29B 17/02* (2013.01); *B29C 48/0022* (2019.02);
(Continued)

(58) Field of Classification Search
CPC .... B09B 3/35; B09B 3/29; B09B 3/50; B02C 19/0075; B02C 23/14; B29C 48/0022; B29C 48/69; C08J 11/06; C08J 2323/12; B29B 2017/0203; B29B 2017/0241; B29B 2017/0272; Y02W 30/62
See application file for complete search history.

(56) References Cited

U.S. PATENT DOCUMENTS 6,335,376 B1 1/2002 Allen, III et al.
7,231,927 B2 6/2007 Suehara
8,113,354 B2 2/2012 Toida et al.

FOREIGN PATENT DOCUMENTS

CN 108464547 A * 8/2018 ............. A41D 13/11
CN 113771265 A * 12/2021 ............. B29B 17/02
(Continued)

OTHER PUBLICATIONS

Machine translation of TR 202007941 by Dasdemir et al. (Year: 2020).*
(Continued)

*Primary Examiner* — Christina H.W. Rosebach

(57) ABSTRACT

Described herein are methods of recycling polypropylene based personal protective equipment. The method may comprise the steps of: (a) conveying a feed of personal protective equipment; (b) cleaning at least a portion of the feed of personal protective equipment; (c) fragmenting the personal protective equipment into a plurality of fragments, the plurality of fragments comprising non-polypropylene fragments and polypropylene fragments; (d) separating at least a portion of the non-polypropylene fragments from the polypropylene fragments to produce a batch of polypropylene fragments; and (e) pelletizing the batch of polypropylene fragments to produce polypropylene pellets.

19 Claims, 4 Drawing Sheets

(51) Int. Cl.

| | |
|---|---|
| ***B02C 23/14*** | (2006.01) |
| ***B09B 3/29*** | (2022.01) |
| ***B09B 3/50*** | (2022.01) |
| ***B29B 9/06*** | (2006.01) |
| ***B29B 13/08*** | (2006.01) |
| ***B29B 17/00*** | (2006.01) |
| ***B29B 17/02*** | (2006.01) |
| ***B29C 48/00*** | (2019.01) |
| ***B29C 48/69*** | (2019.01) |
| ***C08J 11/06*** | (2006.01) |
| *B29K 23/00* | (2006.01) |

(52) U.S. Cl.
CPC ............... *B29C 48/69* (2019.02); *C08J 11/06* (2013.01); *B29B 2017/001* (2013.01); *B29B 2017/0203* (2013.01); *B29B 2017/0241* (2013.01); *B29B 2017/0272* (2013.01); *B29K 2023/12* (2013.01); *C08J 2323/12* (2013.01); *Y02W 30/62* (2015.05)

(56) References Cited

FOREIGN PATENT DOCUMENTS

| | | | |
|---|---|---|---|
| EP | 441012 | A2 | 8/1991 |
| WO | 2012117250 | A1 | 9/2012 |
| WO | 2013057737 | A2 | 4/2013 |

OTHER PUBLICATIONS

Machine translation of CN 113771265 by Zhang et al. (Year: 2020).*

Machine Translation of WO 9937452 by De Feraudy. (Year: 1999).*

“Screw Design” in Plastics Technology Handbook (5th Edition) ed Chanda, Manas; published by Taylor & Francis; 2018 Chp 2 Fabrication Processes (Year: 2018).*

“Plastics Packaging—Properties, Processing, Applications, and Regulations” Chp. 7 “extrusion, Film and sheet” by Selke, Susan E. M.; Culter, John D.; Auras, Rafael A.; Rabnawaz, Muhammad. Published by Hanser Publishers. (Year: 2021).*

Machine translation of CN 108464547 by Wang et al. (Year: 2018).*

* cited by examiner

SYSTEM AND METHOD FOR RECYCLING PERSONAL PROTECTIVE EQUIPMENT

FIELD

This application relates to the field of recycling personal protective equipment. Specifically, this application relates to systems and methods for recycling polypropylene-based masks, respirators, gowns, and other personal protective equipment.

INTRODUCTION

The following is not an admission that anything discussed below is part of the prior art or part of the common general knowledge of a person skilled in the art.

Up to 7,200 tons of medical waste (i.e., personal protective equipment) is estimated to be generated every day. Much of this medical waste is made up of polypropylene-based masks. Due to their composition, polypropylene-based masks do not decompose. Accordingly, micro-sized plastic particles which may further fragment into nano plastics are generated due to the large volume of polypropylene-based masks in landfill sites. Plastic particles are harmful to the planet and have even been found within food supplies. Therefore, there is need for a system and method for recycling personal protective equipment.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, there is provided a method of recycling polypropylene based personal protective equipment. The method may include conveying a feed of personal protective equipment; cleaning at least a portion of the feed of personal protective equipment; fragmenting the personal protective equipment into a plurality of fragments where the plurality of fragments includes non-polypropylene fragments and polypropylene fragments; separating at least a portion of the non-polypropylene fragments from the polypropylene fragments to produce a batch of polypropylene fragments; and pelletizing the batch of polypropylene fragments to produce polypropylene pellets.

These and other aspects and features of various embodiments will be described in greater detail below.

DRAWINGS

For a better understanding of the described embodiments and to show more clearly how they may be carried into effect, reference will now be made, by way of example, to the accompanying drawings in which.

Figure 1:
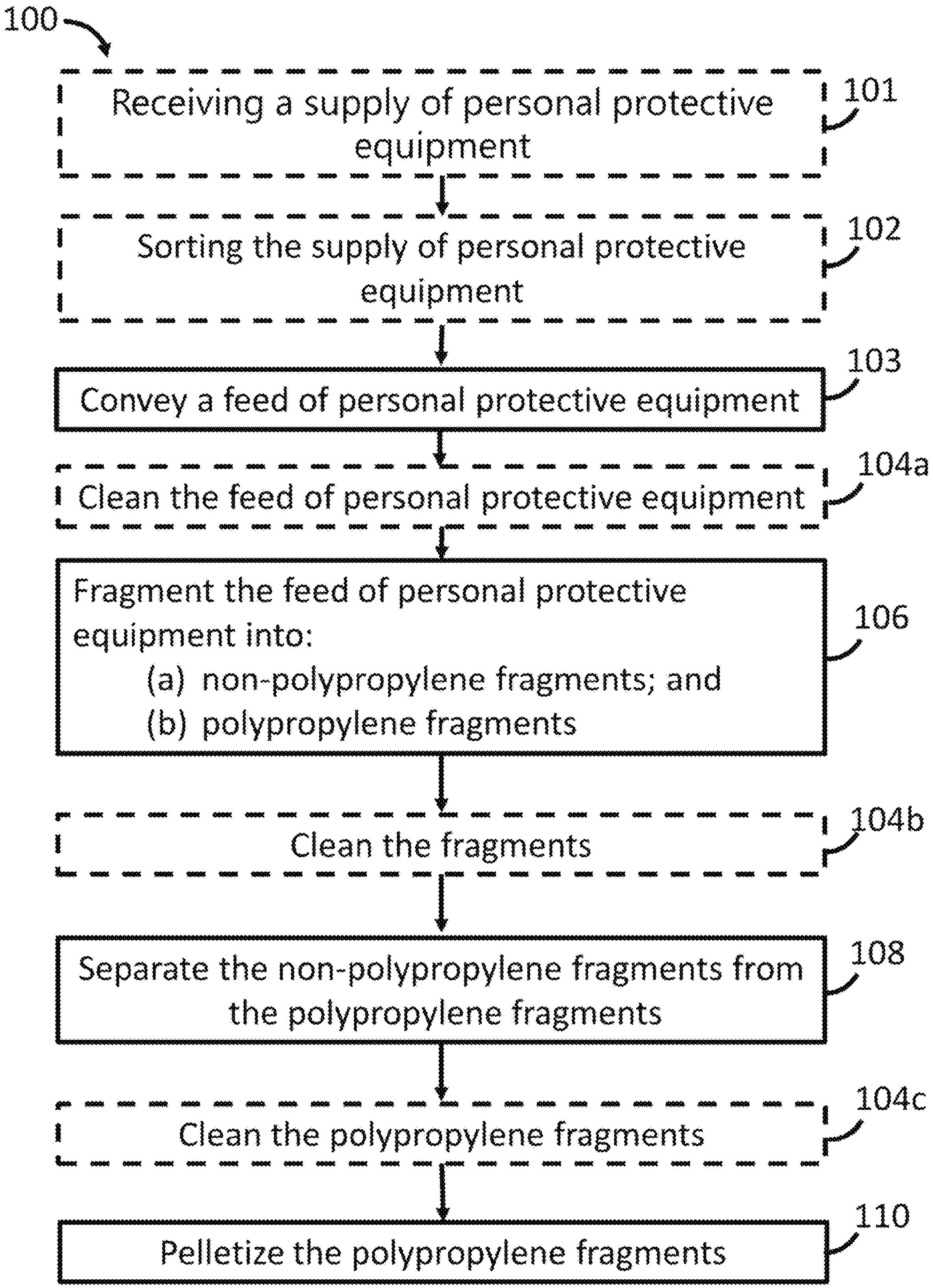
FIG. 1 is a flowchart illustrating a method for recycling personal protective equipment in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Some elements herein may be identified by a part number, which is composed of a base number followed by an alphabetical or subscript-numerical suffix (e.g. 112*a*, or $\mathbf{112}_1$). Multiple elements herein may be identified by part numbers that share a base number in common and that differ by their suffixes (e.g. 112$_1$, 112$_2$, and 112$_3$). All elements with a common base number may be referred to collectively or generically using the base number without a suffix (e.g. 112).

General Description of a Method of Recycling Personal Protective Equipment

Systems known in the art for recycling plastics are not sufficient for recycling personal protective equipment because personal protective equipment may be contaminated with biohazardous materials. In fact, recycling facilities routinely discard used personal protective equipment because they may contain traces of biohazardous materials.

In addition, personal protective equipment is routinely discarded because items of personal protective equipment, masks in particular, may be constructed from a plurality of different materials. For example, a mask may be constructed from polypropylene (i.e., the mask covering), polyethylene terephthalate and/or polyethylene terephthalate spandex blends (i.e., ear loops/headbands), aluminum or galvanized iron (i.e., the nosepiece), and foam (i.e., padding). Since personal protective equipment may be constructed from many types of materials, known recycling systems are unable to effectively recycle personal protective equipment (masks in particular).

Figure 2:
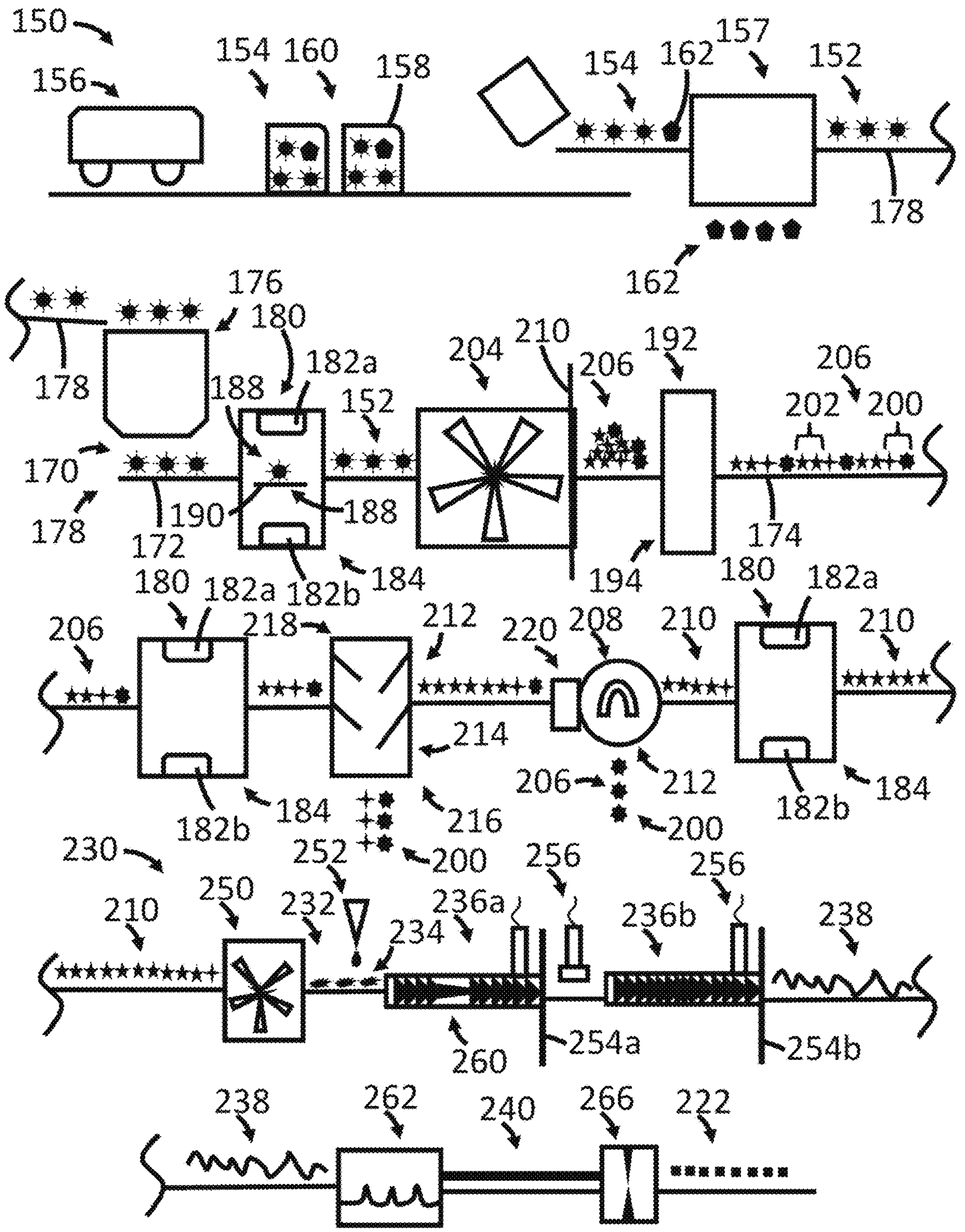
FIG. 2 is a schematic illustration illustrating a system for recycling personal protective equipment in accordance with an embodiment.

Referring first to FIG. 1, shown therein is a flowchart illustrating a method 100 for recycling personal protective equipment 152. FIG. 2, schematically illustrates an example of a system 150 for recycling personal protective equipment 152 (i.e., a system able to carry out the method 100). As shown in FIG. 1, the method 100 may begin at step 101 in which a supply 154 of personal protective equipment 152 is received.

Figure 4:
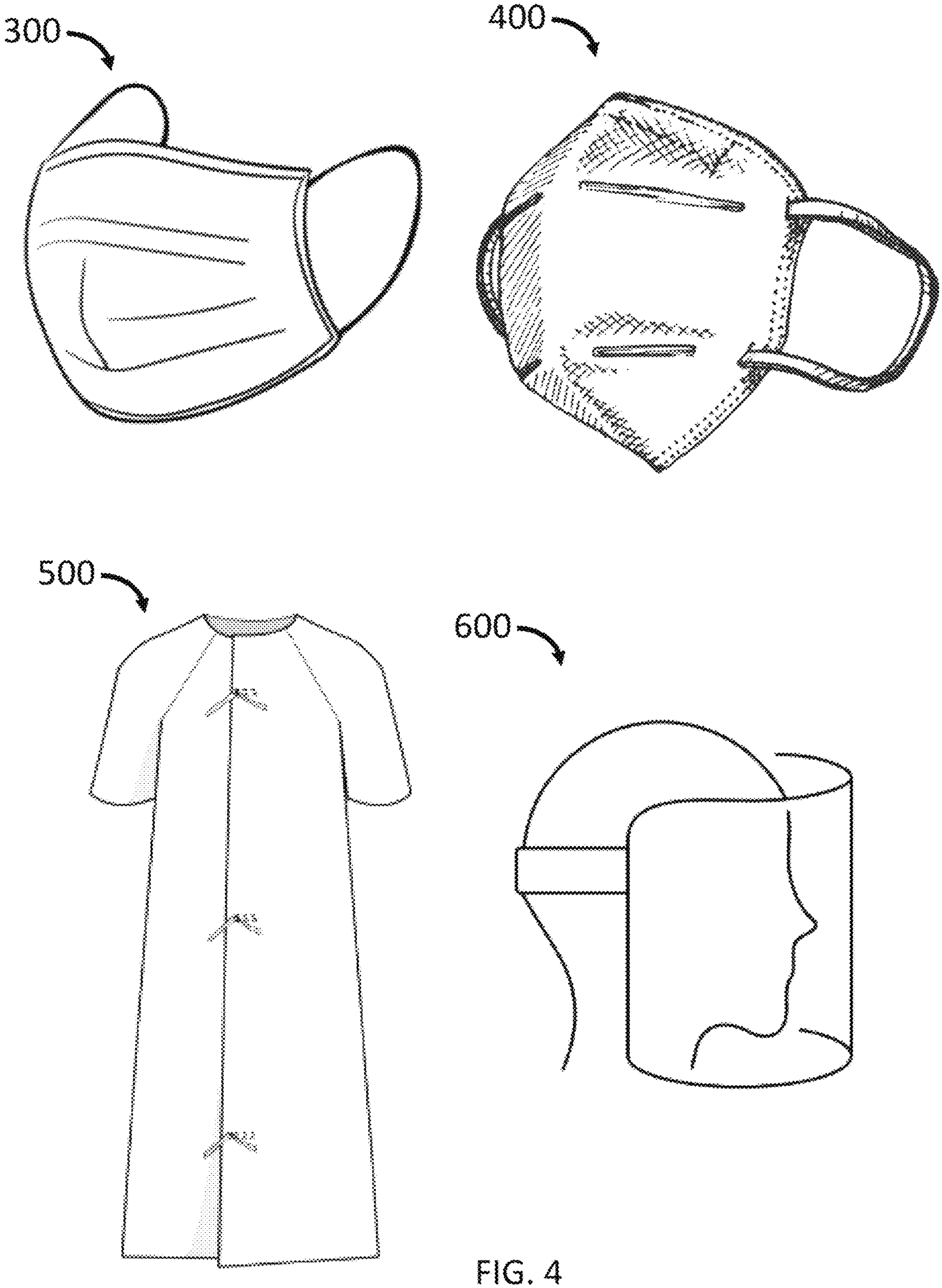
FIG. 4 shows various types of personal protective equipment in accordance with various embodiments.

FIG. 4 shows examples of personal protective equipment 152, which may be included in the supply 154 (FIG. 2) referred to in step 102 of method 100 (see FIG. 1). As shown, the personal protective equipment 152 may include any of masks 300, respirators 400, gowns 500, face shields 600, and other similar articles.

As shown in FIG. 2, the supply 154 of personal protective equipment 152 may have been delivered to the recycling facility by, for example, a personal protective equipment collection company 156. The company 156 that collects the supply 154 of personal protective equipment 152 (e.g., by proving collection containers 158 at a medical facility such as a hospital) may or may not be affiliated with the recycling facility.

In some examples, the received supply 154 of personal protective equipment 152 may first be at least partially disinfected. For example, as shown in FIG. 2, the received supply 154 of personal protective equipment 152 may be stored for at least 72 hours in a storage area 160. Storing the supply 154 of personal protective equipment 152 for at least 72 hours may partially disinfect the personal protective equipment 152. For example, storing the personal protective equipment 152 for at least 72 hours may allow some or all of any biological contamination (e.g., viral and bacterial matter) on the personal protective equipment 152 to die or become inactivated or less harmful (or harmless) to humans before further processing. This may help protect downstream equipment and workers from exposure to harmful biological contamination.

Figure 3:
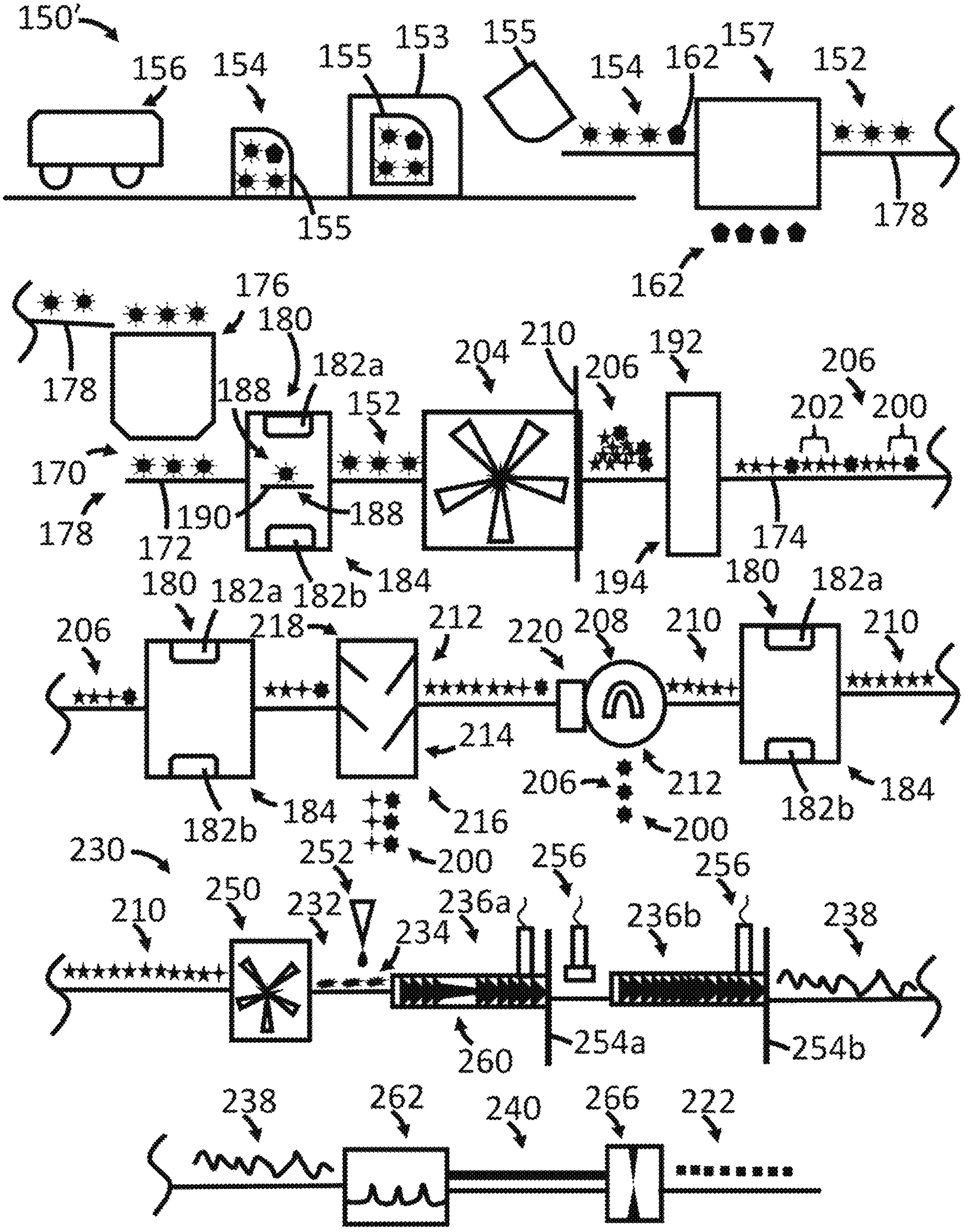
FIG. 3 is a schematic illustration illustrating a system for recycling personal protective equipment in accordance with a second embodiment.

Referring now to FIG. 3, an alternative system 150' for recycling personal protective equipment 152 is shown. System 150' is identical to system 150, except system 150' includes an ozone sterilization chamber 153. The ozone sterilization chamber 153 may be used to at least partially disinfect the received supply 154 of personal protective equipment 152. That is, in systems that include an ozone sterilization chamber 153, instead of (or in addition to) storing the supply 154 of personal protective equipment 152 for at least 72 hours, the supply 154 of personal protective equipment 152 may be subjected to a treatment of ozone gas within the ozone sterilization chamber 153 to at least partially disinfect the supply 154 of personal protective equipment 152. Ozone is a highly reactive molecule that can destroy a wide range of bacteria, viruses, fungi, and other microorganisms by breaking down their cell walls and damaging their genetic material. Ozone gas disinfection occurs at room temperature, which makes it a suitable method for disinfecting temperature-sensitive materials such as personal protective equipment, which may be damaged by heat disinfection methods like autoclaving. Further, ozone gas is a dry virucide which can reach the crevices and shadows that spray disinfectants or ultraviolet disinfection cannot. Additionally, ozone gas leaves no residue, unlike some chemical disinfectants, and is considered to be environmentally friendly.

As shown in FIG. 3, in some examples, the supply 154 of personal protective equipment 152 delivered to the recycling facility may be stored in (i.e., may be received in or transferred to) ozone resistant containers 155 (e.g., bags). The ozone resistant containers 155 containing the personal protective equipment may be transferred to the ozone sterilization chamber 153 so that the personal protective equipment 152 within the containers 155 may be disinfected. In some examples, the personal protective equipment 152 is exposed to at least 10 ppm of ozone for a period of at least 30 minutes within the ozone sterilization chamber 153. In other examples, the personal protective equipment 152 is exposed to at least 20 ppm of ozone for a period of at least 30 minutes within the ozone sterilization chamber 153. It has been found that administering a dose of at least 10 ppm of ozone for a period of at least 30 minutes can render approximately 99% of viruses inactive.

In some examples, the supply 154 of personal protective equipment 152 may both (a) be stored for at least 72 hours; and (b) be subjected to ozone sterilization.

Optionally, as shown in FIGS. 1, 2, and 3, at step 102, non-polypropylene based personal protective equipment 162 may be removed from the supply 154 of personal protective equipment 152 after disinfecting the supply 154 of personal protective equipment 152 (e.g., after storing the supply 154 for at least 72 hours and/or subjecting the supply 154 to ozone gas) and prior to conveying a feed 170 of personal protective equipment 152. That is, the supply 154 may pass through any sorter 157 or combination of sorters capable of separating non-polypropylene based personal protective equipment 162 from the personal protective equipment 152. For example, the supply 154 may pass through a sorting shaker table which allows dirt and debris and non-polypropylene based personal protective equipment 162 such as, for example, shoe covers, to pass through holes in the sorting shaking table while allowing polypropylene based personal protective equipment 152 to pass through. In addition, or alternatively, workers may sort through the supply 154 of personal protective equipment 152 to remove, for example, gloves and other various forms of debris. Alternatively, the sorting may have occurred before receiving the supply 154 of personal protective equipment 152 at step 101.

Returning to FIGS. 1 and 2, method 100 includes the step 103 of conveying the feed 170 of personal protective equipment 152. This may include moving the personal protective equipment 152 from the receiving and/or storage location 160 within a recycling facility to a processing line 172. The processing line 172 may include any number of conveyor belts 174, hoppers 176, processing equipment, etc. In some examples, conveying the feed 170 of personal protective equipment 152 includes emptying a container of personal protective equipment 152 into a hopper 176 which forms a start 178 of the processing line 172. In other examples, the start of the processing line 172 may not be configured as a hopper 176. In some examples, as shown in FIG. 2, the start 178 of the processing line 172 may be a hopper 176, but the hopper 176 may be supplied with personal protective equipment 152 from an upstream conveyor 178. Accordingly, conveying a feed 170 of personal protective equipment 152 may include any procedure suitable for providing a feed 170 of personal protective equipment 152 to the start 178 of a processing line 172.

Still referring to FIGS. 1 and 2, at step 104*a*, after the feed 170 of personal protective equipment 152 is conveyed, the feed 170 of personal protective equipment 152 may be cleaned. As indicated by the dashed lines, step 104*a* is optional. That is, in some examples the feed 170 of personal protective equipment 152 is cleaned before step 106, and in other examples the feed 170 of personal protective equipment 152 is not cleaned before step 106.

FIG. 1 shows a number of optional cleaning steps in method 100 (i.e., step 104*a*, 104*b*, and 104*c*). Various embodiments may include one or more or all of cleaning steps 104. For example, some embodiments, may include cleaning step 104*a* or 104*b* or 104*c*, or any combination of two or more of cleaning steps 104*a*, 104*b*, and 104*c*. In other embodiments, method 100 includes none of cleaning steps 104.

Referring back to FIGS. 1 and 2, during any one of steps 104*a*, 104*b*, 104*c* at least a portion of the feed 170 of personal protective equipment 152 is cleaned. In some embodiments, only a portion of the feed 170 of personal protective equipment 152 may be cleaned at any one of steps 104*a*, 104*b*, 104*c* (i.e., at least some of the personal protective equipment 152 in the feed 170 may not be cleaned) because, as is described in more detail below, some of the feed 170 of personal protective equipment 152 to be recycled may be removed from the processing line 172 at various stages thereof. Alternatively or in addition, only a portion of the feed 170 of personal protective equipment 152 may be cleaned at any one of steps 104*a*, 104*b*, 104*c* because cleaning the feed 170 of personal protective equipment 170 may not be 100% successful. That is, for example, one out of every 20 items of personal protective equipment 152 that pass through a cleaner 180 may not be cleaned due to limitations in the system 150.

In other embodiments, all of the personal protective equipment 152 in the feed 170 may be cleaned at one or more (or all) of the cleaning steps 104.

As used herein and in the claims, "cleaning" an object (e.g., part or all of a piece of personal protective equipment 152) means to remove any one or more of dirt, debris, or biological contamination (e.g., viral or bacterial) from the object and/or to kill or inactivate biological contamination on the object. For example, cleaning the feed 170 of personal protective equipment 152 may include exposing the feed 170 of personal protective equipment 152 to ultraviolet (UV) light. In some cases, not all surfaces of the personal protective equipment 152 may be exposed to the UV light. That is, for example, a first piece of personal protective equipment 152 may occlude (e.g., overlap) a portion of a second piece of personal protective equipment 152 when each of the first and second pieces of personal protective equipment 152 are being exposed to UV light. Therefore, the portion of the second piece of personal protective equipment 152 occluded by the first piece may not be cleaned by the UV light.

In some examples of method 100, the feed of personal protective equipment may be exposed to UV light at any one or more (or all) of steps 104*a*, 104*b*, 104*c*. Alternatively or in addition, at any one or more (or all) of steps 104*a*, 104*b*, and 104*c*, cleaning may comprise the use of any one or more (or all) of ethylene oxide, vaporized hydrogen peroxide, microwaves, moist heat, and bleach to clean at least a portion of the feed of personal protective equipment.

When cleaning a least a portion of the feed 170 of personal protective equipment 152 using a UV light 182, the UV light 182 may kill or inactivate various types harmful biological contamination (e.g. biohazardous viruses), such as by damaging the DNA and/or RNA of the contaminant (e.g. virus). In some examples, short wavelength UV radiation (UV-C, $\lambda$=254 nm) is used to clean the personal protective equipment.

Optionally, any one of steps 104*a*, 104*b*, 104*c* may include passing at least a portion of the feed of personal protective equipment through a UV tunnel 184 to increase the amount of surface area of the personal protective equipment 152 being exposed to UV light. That is, for example, for a piece of personal protective equipment 152 having an upper side 186 and a lower side 188, each of the upper side 186 and the lower side 188 may simultaneously be exposed to UV light.

In some examples, at any one of steps 104*a*, 104*b*, 104*c*, the feed 170 of personal protective equipment 152 is transported along a carrier surface 190, which may be a foraminous belt (e.g., a grid belt, such as a stainless steel grid belt) or a UV transparent sheet (e.g. UV transparent glass or acrylic sheet) as it is exposed to the UV light 182. This may reduce or eliminate the degree to which the conveyor belt 174 occludes the feed 170 of personal protective equipment 152 from the lower UV light source 182*b* below thereby increasing the cleaning efficiency (i.e., increasing the percentage of UV treatable biological contamination that is killed or inactivated by the UV light treatment).

Any step 104 that includes exposing the feed 170 of personal protective equipment 152 to a UV light 182 may (or may not) further include a sub-step of dispersing (i.e., spreading out) the feed 170 of personal protective equipment 152 before or during exposure to the UV light 182. This may reduce surface occlusion and thereby increase the degree to which the personal protective equipment 152 is exposed to the UV light 182.

System 150 may include any dispersal equipment 192 suitable for dispersing the feed 170 of personal protective equipment 152 before or during exposure to UV light 182. For example, system 150 may include a feed disperser 194, such as a vibrating feeder as shown to spread out the feed 170 of personal protective equipment 152. As shown, feed disperser 194 (e.g., vibrating feeder) may be positioned upstream of the cleaner 180 so that the feed 170 of personal protective equipment 152 is dispersed prior to cleaning. Alternatively, feed disperser 194 may be at least partially collocated (e.g., extend through or beneath) the cleaner 180 to disperse the feed 170 of personal protective equipment 152 simultaneously as the feed 170 is exposed to UV radiation.

In some examples, the personal protective equipment 152 is exposed to at least 20 mJ/cm$^2$ of UV radiation. This dosage of radiation exposure has been found to inactivate most bacteria and viruses including SARS COV. In some examples, the personal protective equipment 152 is exposed to at least 20 $mW/cm^2$ for a duration of at least 10 s. This provides a dosage of at least 200 $mJ/cm^2$ to the personal protective equipment 152. In examples where the personal protective equipment 152 is exposed to UV radiation on multiple sides of that personal protective equipment 152, each side may receive a dosage of at least 200 $mJ/cm^2$.

Referring still to FIGS. 1 and 2, at step 106, the feed 170 of personal protective equipment 152 may be fragmented into non-polypropylene fragments 200 and polypropylene fragments 202. It will be appreciated that a fragment may comprise polypropylene components and non-polypropylene components. Accordingly, for the purposes of this disclosure and the claims, a fragment is considered to be a "polypropylene fragment 202" when a majority of that fragment, by weight, is polypropylene. Similarly, a fragment is considered to be a "non-polypropylene fragment 200" when less than a majority of that fragment, by weight, is polypropylene.

The composition of individual pieces of personal protective equipment 152 in the feed 170 may include both polypropylene and non-polypropylene. For example, a polypropylene-based mask is typically 65% to 80% by weight polypropylene and 35% to 20% by weight non-polypropylene. The non-polypropylene components of a mask may include for example metal nose pieces, elastic straps, polyethylene terephthalate visors, and foam padding. As an example, a mask may be at least 72% by weight polypropylene, up to 10% by weight polyethylene terephthalate and spandex blend, up to 2% by weight polyethylene terephthalate, up to 2% by weight synthetic rubber, up to 5% by weight aluminum, up to 7% by weight ferrous metal, and up to 2% by weight foam.

System 150 may include any fragmenter 204 suitable for granulating the personal protective equipment 152. A fragmenter 204 has an inlet for receiving the feed 170 of personal protective equipment 152, a plurality of cutting blades for granulating the personal protective equipment 152, and an outlet for discharging a plurality of fragments (i.e., fragmented personal protective equipment). In some examples (and not others), the fragmenter 204 may be fully enclosed to reduce dust production. Optionally, the fragmenter 204 may have a cutting blade geometry that provides double cross scissor cutting. Optionally, the fragmenter 204 may include any one or more (or all) of a vacuum evacuation system, a cyclone receiver, and air filtration for removing dust from the processing line.

The fragmenter 204 may be configured to produce fragments 206 having an average particle size of at least about 8 mm. This may mitigate the creation of particles that are so small that they tend to agglomerate, making it difficult to separate polypropylene fragments 202 from non-polypropylene fragments 200 (as described in more detail below). Moreover, metallic fragments 206 that are too small may not be efficiently collected by the magnetic-eddy current separator 208 (described in more detail below). Overall, an average particle size of at least about 8 mm may help to improve the efficiency of recycling polypropylene from the feed 170 of personal protective equipment 152. In some embodiments, fragmenter 204 may be equipped with a mesh 210 having pores of at least 12 mm, which may increase the likelihood of fragments 206 exiting the fragmenter 204 having an average particle size of at least about 8 mm.

Alternatively or in addition to producing fragments 206 having an average particle size of at least 8 mm, fragmenter 204 may be configured to produce fragments 206 having an average particle size of less than about 12 mm. Fragments 206 that are too large may result in inefficient polypropylene separation because the large fragments may contain a significant quantity of attached polypropylene and be discarded during separation downstream. For example, in the context of masks, large particles may include pieces of metal nose pieces wrapped in a significant quantity of polypropylene mask material. Overall, an average particle size of less than about 12 mm may help to improve the efficiency of recycling polypropylene from the feed 170 of personal protective equipment 152. In some embodiments, fragmenter 204 may be equipped with a mesh 210 having pores of less than 16 mm, which may increase the likelihood of fragments 206 exiting the fragmenter 204 having an average particle size of less than about 12 mm.

In alternative embodiments, fragmenter 204 may be configured to produce fragments 206 having an average particle size of less than 8 mm or greater than 12 mm.

Referring still to FIGS. 1 and 2, after the feed 170 of personal protective equipment 152 has been fragmented at step **104*b* the plurality of fragments 206 may be cleaned. As described above, cleaning the fragments at step 104*b* may in some embodiments include one or both of (a) dispersing the fragments 206 to maximize the surface area exposed to the UV light 182**; and (b) radiating the plurality of fragments with UV light.

As shown in FIGS. 1 and 2, a cleaning step 104 may be performed before fragmenting (e.g., at **104*a*) and/or after fragmenting (e.g., at 104*b*). At least where the cleaning step 104 includes UV radiation, performing the cleaning 104 on fragments 206 of personal protective equipment 152 after fragmenting (e.g. at 104*b*) as opposed to, or in addition to exposing the feed 170 of personal protective equipment 152 to UV light prior to fragmenting (e.g., at 104*a*) may improve the efficiency of the UV treatment (i.e., increase the percentage of the surface areas treated to UV radiation) because the personal protective equipment 152 prior to fragmenting may include significant surface areas that are folded inwards and thereby occluded from the UV light source 182**.

Any single cleaning step 104 (e.g., **104*a*, 104*b*, or 104*c*), or a combination of two or more (or all) of cleaning steps 104 collectively, may provide at least 75% efficiency. That is, the step(s) may radiate at least 75% of an aggregate surface area of the personal protective equipment 152** (before and/or after fragmenting) with UV light (e.g., with a dosage of at least 20 mJ/cm2 to the radiated surface areas). Radiating at least 75% of the aggregate surface area with UV light (e.g., to a dosage of at least 20 mJ/cm2 on the exposed surface areas) has been found to be sufficient to greatly improve the safety of the equipment, facility, and workers from biological contamination.

Dispersing the plurality of fragments 206 before or during cleaning step(s) 104 may include or assist with achieving the above-mentioned 75% efficiency. For example, dispersing the fragments 206 may include or assist with exposing at least 75% of an aggregate surface area of the personal protective equipment 152 (before and/or after fragmentation) to the UV light emitted in cleaning step(s) 104.

In alternative embodiments, cleaning steps 104 may collectively provide less than least 75% UV radiation efficiency.

Still referring to FIGS. 1 and 2, at step 108, at least a portion of the non-polypropylene fragments 200 are separated from the polypropylene fragments 202 to produce a batch 210 of polypropylene fragments 200. It will be appreciated that sorting systems may not be 100% accurate. Accordingly, the batch 210 of polypropylene fragments 202 may not contain 100% of the polypropylene found in the original feed 170 of personal protective equipment 152. Likewise, the batch 210 of polypropylene fragments 202 may contain some contaminants (i.e., non-polypropylene material). In some examples, the feed 170 of personal protective equipment 152 may be less than 80% by weight polypropylene and the batch 210 of polypropylene fragments 202 may have an average composition that is at least 90%, for example, 92%, 95% or 98% by weight polypropylene.

System 150 may include any particle sorter 212 known in the art suitable for separating the non-polypropylene fragments 200 from the polypropylene fragments 202.

In one example, particle sorter 212 is a zig zag separator 214. Zig zag separator 214 may blow air through separation channels from a bottom 216 of the separator 214 to the top 218 such that heavier (i.e., denser) materials fall through the air flow and may be discharged through the separator base. Lighter material may be transported by the air flow to a cyclone and may be discharged from the separator 214 via a rotary gate valve.

A zig zag separator 214 may provide efficient sorting of aluminum, iron, polyethylene terephthalate and spandex blends, and polyethylene terephthalate from polypropylene because of their relative differences in density. The densities of aluminum (e.g., 2.70 g/cm3), iron (e.g., 7.87 g/cm3), polyethylene terephthalate and spandex blend (e.g., 1.52 g/cm3), and polyethylene terephthalate (e.g., 1.38 g/cm3) are typically much higher than that of polypropylene (e.g., 0.90-0.92 g/cm3).

In some examples of sorting efficiency by particle sorter 212 (e.g., a zig zag separator 214), a plurality of fragments 206 entering a zig zag separator 214 may contain at least 12% by weight aluminum and iron and may exit containing less than 1-2% by weight aluminum and iron (e.g., at least than 80% sorting efficiency). In some examples, a plurality of fragments 206 entering a zig zag separator 214 may contain at least 12% by weight polyethylene terephthalate and polyethylene terephthalate and spandex blends and may exit containing less than 3% to 4% by weight polyethylene terephthalate and polyethylene terephthalate and spandex blends (e.g., at least 60% sorting efficiency). In some examples, a plurality of fragments 206 containing at least 28% by weight contaminants (i.e., non-polyethylene fragments 200) may exit a zig zag separator 214 containing less than 5% by weight contaminants (e.g., at least 80% sorting efficiency).

Optionally, system 150 may include a magnetic-eddy current separator 208 to separate at least a portion of the polypropylene fragments 202 from at least a portion of the non-polypropylene fragments 200. In some examples, system 150 may include both a magnetic-eddy current separator 208 and a zig zag separator 214 as shown. A magnetic-eddy current separator 208 may provide efficient separation of metallic fragments 206 from non-metallic (e.g., polypropylene fragments), which may mitigate damage to downstream equipment from such metallic fragments.

Optionally, the magnetic-eddy current separator 208 may be equipped with a vibratory feeder 220 at an entrance thereto. In some embodiments, the vibratory feeder 220 may have an extended length by adding wedges to spread the fragments 206 into single layer. Spreading the fragments 206 into a single layer may increase a separation efficiency of the magnetic-eddy current separator 208, as metal embedded in a multi-layered pile may not be efficiently separated.

In some examples, a plurality of fragments 206 entering a magnetic-eddy current separator 208 may contain at least 1% to 2% by weight metal fragments and may exit containing less than 0.5% by weight metal fragments (e.g. at least 50% separation efficiency).

As show in FIGS. 1 and 2, after the non-polypropylene fragments 200 are separated from the polypropylene fragments 202, the batch 210 of polypropylene fragments 202 which continue downstream the processing line 172 may be cleaned at 104*c*. Cleaning the polypropylene fragments 202 at 104*c* after separating at 108 may allow the cleaning treatment to be focused exclusively on the polypropylene fragments 202 which will ultimately be recycled (e.g., pelletized for future use, such as to form new products). As compared with cleaning prior to separating (e.g., at 104*b*), cleaning after separating (e.g., at 104*c*) may provide greater cleaning efficiency (e.g., higher UV radiation efficiency) of the polypropylene fragments 202 because the polypropylene fragments 202 will not be occluded by the non-polypropylene fragments 200 which have been removed during sorting at 108.

At 110, the batch 210 of polypropylene fragments 202 may be pelletized. That is, the batch 210 of polypropylene fragments 202 may be turned into a plurality of polypropylene pellets 222. System 150 may include any pelletizer 230 suitable for converting a batch 210 of polypropylene fragments 202 into a plurality of polypropylene pellets 222.

In some examples, pelletizer 230 may pelletize the polypropylene fragments 202 as follows:

- compact the batch 210 of polypropylene fragments 202 to produce a feed 232 of polypropylene flakes 234;
- melt the feed 232 of polypropylene flakes 234 by passing the polypropylene flakes 234 through at least one extrusion barrel 236 to produce molten polypropylene 238;
- cool the molten polypropylene 238 to produce extruded polypropylene 240; and
- cut the extruded polypropylene 240 into a plurality of pellets 222.

The pelletizer 230 may include a compactor 250 having rotary and fixed blades to grind the batch 210 of polypropylene fragments 202 for the above compacting step. Optionally, the compactor 250 may include a dust and moisture collector for removing dust and moisture that is created when compacting the batch 210 of polypropylene fragments 202.

In some examples, a dyeing solution 252 may be added to the batch 210 of polypropylene fragments 202 before melting the feed 232 of polypropylene flakes 234 (e.g., before or after compacting). The dyeing solution 252 may be added when a pellet 222 of a particular colour/shade is desired. Alternatively or in addition, compatibilizer may be added to the batch 210 of polypropylene fragments 202 before melting the feed 232 of polypropylene flakes 234 (e.g., before or after compacting).

Pelletizer 230 may include at least one extrusion barrel 236 to melt the feed 232 of polypropylene flakes 234 for the above melting step. Pelletizer 230 may include any extrusion barrel(s) 236 suitable for melting the feed 232 of polypropylene flakes 234. In some instances, it may be desirable to use more than one extrusion barrel 236 so that contaminants can be filtered out at multiple stages during pelletization.

For example, pelletizer 230 may include one or more screens 254 for reducing contaminants from the melt. After melting the polypropylene flakes 234, the pelletizer 230 may pass the molten polypropylene 238 through the one or more screens 254. In some embodiments, pelletizer 230 may pass the molten polypropylene 238 through a first screen 254*a*

(e.g., a screen having a weave of 30 to 50 mesh), remelt, and then pass the molten polypropylene 238 through a second, finer screen 254*b* (e.g., a screen having a weave of 90 to 110 mesh). Each screen 254 may inhibit contaminants of a certain size from passing through.

In some examples, the pressure across at least one of the screens 254 may be measured, and when a threshold value is detected, the screen 254 may be cleaned. In some examples, cleaning the screen 254 comprises replacing the screen 254 with a new screen 254. In other examples, at least one of the screens 254 may be self-cleaning (e.g., wiped clean of collected contaminants).

In some examples, pelletizer 230 may operate at least one of the extrusion barrels 236 at between 170 and 190 degrees Celsius. This may help filter out the polyethylene foam from the batch 210 of polypropylene fragments 202. The melting temperature of polyethylene foam is 190 degrees Celsius, therefore, operating the extrusion barrel 236 between 170 and 190 degrees Celsius may not melt the polypropylene foam, increasing the likeliness of the polypropylene foam being captured by a screen 254.

Pelletizer 230 may degas the polypropylene within the extrusion barrels 254 to allow the filtration of volatile materials, such as micro molecules and moisture produced when melting the polypropylene, before being released into the environment, and to increase the quality of the pellets 222. Pelletizer 230 may include any suitable degasser 256. In embodiments when the pelletizer 230 includes multiple extrusion barrels 236 positioned in series, as shown, a degasser 256 may be positioned between adjacent extrusion barrels 236*a*, 236*b*.

In some examples, pelletizer 230 includes at least one extrusion barrel 256 with a mixing region 260. It may be desirable to include a mixing region 260 as the batch 210 of polypropylene fragments 202 entering the extrusion barrels 236 may have different melt flow indices (MFI) due to the contaminants contained within the batch 210 of polypropylene fragments 202. For example, the batch 210 of polypropylene fragments 202 may have a sub-batch having an MFI of 25-40 g/10 min and a second sub-batch having an MFI of 400-1500 g/10 min. The mixing region 260 may have a residence time between 1 and 3 minutes, for example 2 minutes. Providing a mixing region 260 may increase the homogeneity of the molten polypropylene 238 exiting the extrusion barrel(s) 236, and thereby increase the homogeneity of the resulting pellets 222.

Downstream from the extrusion barrel(s) 236, the molten polypropylene 238 may be cooled to produce extruded polypropylene 240. Optionally, pelletizer 230 may include a water cooler 262 to cool the molten polypropylene 238.

After the molten polypropylene 238 has been cooled to produce extruded polypropylene 240, pelletizer 230 may cut the extruded polypropylene 240 into a plurality of pellets 222. Optionally, the pellets 222 may be 1 mm to 5 mm in diameter (e.g. about 3 mm in diameter). Pelletizer 230 may include any cutter 266 suitable for cutting extruded polypropylene 240 into pellets 222.

The generated pellets 222 may be used for manufacturing plastic products. Optionally, the pellets 222 may be collected in a storage hopper, bagged, and shipped to a manufacturing facility for future uses.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

ITEMS

Item 1. A method of recycling polypropylene based personal protective equipment, the method comprising:
- conveying a feed of personal protective equipment;
- cleaning at least a portion of the feed of personal protective equipment;
- fragmenting the personal protective equipment into a plurality of fragments, the plurality of fragments comprising non-polypropylene fragments and polypropylene fragments;
- separating at least a portion of the non-polypropylene fragments from the polypropylene fragments to produce a batch of polypropylene fragments; and
- pelletizing the batch of polypropylene fragments to produce polypropylene pellets.

Item 2. The method of any preceding item, wherein cleaning the personal protective equipment comprises disinfecting the personal protective equipment with an ultraviolet light.

Item 3. The method of any preceding item, wherein cleaning the personal protective equipment comprises:
- disinfecting the personal protective equipment with a first ultraviolet light prior to fragmenting the personal protective equipment; and
- disinfecting the personal protective equipment with a second ultraviolet light after fragmenting the personal protective equipment.

Item 4. The method of any preceding item further comprising:
- receiving a supply of recyclable personal protective equipment; and
- at least one of (a) storing the supply of recyclable personal protective equipment for at least 72 hours; and (b) subjecting the supply of recyclable personal protective equipment to ozone gas, prior to conveying the feed of personal protective equipment.

Item 5. The method of any preceding item further comprising removing non-polypropylene based material from the supply of recyclable personal protective equipment after at least one of (a) storing the supply of recyclable personal protective equipment for at least 72 hours; and (b) subjecting the supply of recyclable personal protective equipment to ozone gas, and prior to conveying the feed of personal protective equipment.

Item 6. The method of any preceding item further comprising dispersing the plurality of fragments prior to disinfecting the personal protective equipment with the second ultraviolet sterilizer.

Item 7. The method of any preceding item, wherein
- each fragment of the plurality of fragments has a fragment surface area;
- the plurality of fragments has an aggregate surface area which is the sum of the fragment surface areas of each fragment of the plurality of fragments; and
- dispersing the plurality of fragments comprises exposing at least 75% of the aggregate surface area to the second ultraviolet sterilizer.

Item 8. The method of any preceding item, wherein separating at least a portion of the non-polypropylene fragments from the polypropylene fragments to produce a batch of polypropylene fragments comprises at least one of:
- (a) passing the plurality of fragments through at least one of a zig zag separator; and
- (b) passing the plurality of fragments through a magnetic-eddy current separator.

Item 9. The method of any preceding item, wherein
- the feed of personal protective equipment is less than 80% by weight polypropylene; and
- the batch of polypropylene fragments is at least 90% by weight polypropylene.

Item 10. The method of any preceding item, wherein
- the feed of personal protective equipment is less than 80% by weight polypropylene; and
- the batch of polypropylene fragments is at least 95% by weight polypropylene.

Item 11. The method of any preceding item, wherein pelletizing the batch of polypropylene fragments comprises
- compacting the batch of polypropylene fragments to produce a feed of polypropylene flakes;
- melting the feed of polypropylene flakes by passing the polypropylene flakes through at least one extrusion barrel to produce molten polypropylene;
- cooling the molten polypropylene to produce extruded polypropylene; and
- cutting the extruded polypropylene into a plurality of pellets.

Item 12. The method of any preceding item, wherein melting the feed of polypropylene flakes comprises operating at least one extrusion barrel of the at least one extrusion barrel between 170 degrees Celsius and 190 degrees Celsius.

Item 13. The method of any preceding item further comprising filtering the molten polypropylene prior to cooling the molten polypropylene.

Item 14. The method of any preceding item, wherein melting the feed of polypropylene flakes comprises passing the polypropylene flakes through
- a first extrusion barrel of the at least one extrusion barrel;
- a first screen downstream the first extrusion barrel;
- a second extrusion barrel of the at least one extrusion barrel downstream the first screen; and
- a second screen downstream the second extrusion barrel.

Item 15. The method of any preceding item, wherein
- the first screen has a weave of 30 to 50 mesh; and
- the second screen has a weave of 90 to 110 mesh.

Item 16. The method of any preceding item, wherein
- filtering the molten polypropylene comprises passing the molten polypropylene through at least one screen; and
- the method further comprising measuring the pressure across at least one screen of the at least one screen and cleaning the at least one screen of the at least one screen when a threshold value is detected.

Item 17. The method of any preceding item, wherein
- at least one of the at least one extrusion barrels comprises a screw with a mixing region; and
- the method further comprises mixing the feed of polypropylene flakes within the mixing region.

Item 18. The method of any preceding item, wherein
- the feed of polypropylene flakes is mixed within the mixing region for 1 to 3 minutes.

Item 19. The method of any preceding item further comprising degassing the feed of polypropylene flakes within at least one of the at least one extrusion barrels.

Item 20. The method of any preceding item wherein
- the at least one extrusion barrel comprises a first extrusion barrel and a second extrusion barrel downstream from the first extrusion barrel; and
- the feed of polypropylene flakes is degassed between the first extrusion barrel and the second extrusion barrel.

Item 21. The method of any preceding item, wherein pelletizing the batch of polypropylene fragments comprises
- adding a dyeing solution to the batch of polypropylene fragments before melting the feed of polypropylene flakes.

The invention claimed is:

1. A method of recycling polypropylene based personal protective equipment, the method comprising:
- conveying a feed of personal protective equipment;
- cleaning at least a portion of the feed of personal protective equipment;
- fragmenting the personal protective equipment into a plurality of fragments, the plurality of fragments comprising non-polypropylene fragments and polypropylene fragments;
- separating at least a portion of the non-polypropylene fragments from the polypropylene fragments to produce a batch of polypropylene fragments; and
- pelletizing the batch of polypropylene fragments to produce polypropylene pellets,
- wherein pelletizing the batch of polypropylene fragments comprises
  - compacting the batch of polypropylene fragments to produce a feed of polypropylene flakes;
  - melting the feed of polypropylene flakes by passing the polypropylene flakes through at least one extrusion barrel to produce molten polypropylene, said melting comprising passing the polypropylene flakes through:
    - a first extrusion barrel of the at least one extrusion barrel;
    - a first screen downstream the first extrusion barrel, the first screen having a weave of 30 to 50 mesh;
    - a second extrusion barrel of the at least one extrusion barrel downstream the first screen; and
    - a second screen downstream the second extrusion barrel, the second screen having a weave of 90 to 110 mesh;
  - after said melting, cooling the molten polypropylene to produce extruded polypropylene; and
  - cutting the extruded polypropylene into a plurality of pellets.

2. The method of claim 1, wherein cleaning the personal protective equipment comprises disinfecting the personal protective equipment with an ultraviolet light.

3. The method of claim 2, wherein cleaning the personal protective equipment comprises:
- disinfecting the personal protective equipment with a first ultraviolet light prior to fragmenting the personal protective equipment; and
- disinfecting the personal protective equipment with a second ultraviolet light after fragmenting the personal protective equipment.

4. The method of claim 1 further comprising:

receiving a supply of recyclable personal protective equipment; and at least one of (a) storing the supply of recyclable personal protective equipment for at least 72 hours; and (b) subjecting the supply of recyclable personal protective equipment to ozone gas, prior to conveying the feed of personal protective equipment.

5. The method of claim 4 further comprising removing non-polypropylene based material from the supply of recyclable personal protective equipment after at least one of (a) storing the supply of recyclable personal protective equipment for at least 72 hours; and (b) subjecting the supply of recyclable personal protective equipment to ozone gas, and prior to conveying the feed of personal protective equipment.

6. The method of claim 3 further comprising dispersing the plurality of fragments prior to disinfecting the personal protective equipment with the second ultraviolet sterilizer.

7. A method of recycling polypropylene based personal protective equipment, the method comprising:

conveying a feed of personal protective equipment;

cleaning at least a portion of the feed of personal protective equipment;

fragmenting the personal protective equipment into a plurality of fragments, the plurality of fragments comprising non-polypropylene fragments and polypropylene fragments;

separating at least a portion of the non-polypropylene fragments from the polypropylene fragments to produce a batch of polypropylene fragments; and pelletizing the batch of polypropylene fragments to produce polypropylene pellets wherein cleaning the personal protective equipment comprises:

disinfecting the personal protective equipment with a first ultraviolet light prior to fragmenting the personal protective equipment; and disinfecting the personal protective equipment with a second ultraviolet light after fragmenting the personal protective equipment, and wherein each fragment of the plurality of fragments has a fragment surface area;

the plurality of fragments has an aggregate surface area which is the sum of the fragment surface areas of each fragment of the plurality of fragments; and dispersing the plurality of fragments comprises exposing at least 75% of the aggregate surface area to the second ultraviolet sterilizer.

8. The method of claim 1, wherein separating at least a portion of the non-polypropylene fragments from the polypropylene fragments to produce a batch of polypropylene fragments comprises at least one of:

(a) passing the plurality of fragments through at least one of a zig zag separator; and (b) passing the plurality of fragments through a magnetic-eddy current separator.

9. A method of recycling polypropylene based personal protective equipment, the method comprising:

conveying a feed of personal protective equipment;

cleaning at least a portion of the feed of personal protective equipment;

fragmenting the personal protective equipment into a plurality of fragments, the plurality of fragments comprising non-polypropylene fragments and polypropylene fragments;

separating at least a portion of the non-polypropylene fragments from the polypropylene fragments to produce a batch of polypropylene fragments; and pelletizing the batch of polypropylene fragments to produce polypropylene pellets, wherein separating at least a portion of the non-polypropylene fragments from the polypropylene fragments to produce a batch of polypropylene fragments comprises at least one of:

(a) passing the plurality of fragments through at least one of a zig zag separator; and (b) passing the plurality of fragments through a magnetic-eddy current separator, and wherein the feed of personal protective equipment is less than 80% by weight polypropylene; and the batch of polypropylene fragments is at least 90% by weight polypropylene.

10. The method of claim 9, wherein the batch of polypropylene fragments is at least 95% by weight polypropylene.

11. The method of claim 7, wherein pelletizing the batch of polypropylene fragments comprises compacting the batch of polypropylene fragments to produce a feed of polypropylene flakes;

melting the feed of polypropylene flakes by passing the polypropylene flakes through at least one extrusion barrel to produce molten polypropylene;

cooling the molten polypropylene to produce extruded polypropylene; and cutting the extruded polypropylene into a plurality of pellets.

12. The method of claim 11, wherein melting the feed of polypropylene flakes comprises operating at least one extrusion barrel of the at least one extrusion barrel between 170 degrees Celsius and 190 degrees Celsius.

13. The method of claim 11 further comprising filtering the molten polypropylene prior to cooling the molten polypropylene.

14. The method of claim 13, wherein melting the feed of polypropylene flakes comprises passing the polypropylene flakes through a first extrusion barrel of the at least one extrusion barrel;

a first screen downstream the first extrusion barrel;

a second extrusion barrel of the at least one extrusion barrel downstream the first screen; and a second screen downstream the second extrusion barrel.

15. The method of claim 1, wherein the method further comprising measuring the pressure across at least one first screen and the second screen the at least one screen of the at first screen and the second screen value is detected.

16. The method of claim 1, wherein at least one of the at least one extrusion barrels comprises a screw with a mixing region; and the method further comprises mixing the feed of polypropylene flakes within the mixing region.

17. The method of claim 16, wherein the feed of polypropylene flakes is mixed within the mixing region for 1 to 3 minutes.

18. The method of claim 1 further comprising degassing the feed of polypropylene flakes within at least one of the at least one extrusion barrels.

19. The method of claim 18 wherein the at least one extrusion barrel comprises a first extrusion barrel and a second extrusion barrel downstream from the first extrusion barrel; and the feed of polypropylene flakes is degassed between the first extrusion barrel and the second extrusion barrel.

* * * * *